United States Patent
Sawada

(10) Patent No.: US 10,944,879 B2
(45) Date of Patent: Mar. 9, 2021

(54) IMAGE FORMING APPARATUS

(71) Applicant: CANON KABUSHIKI KAISHA, Tokyo (JP)

(72) Inventor: Hirohisa Sawada, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/669,916

(22) Filed: Oct. 31, 2019

(65) Prior Publication Data
US 2020/0153985 A1  May 14, 2020

(30) Foreign Application Priority Data
Nov. 8, 2018  (JP) .............................. JP2018-210697

(51) Int. Cl.
*G06F 3/12* (2006.01)
*H04N 1/00* (2006.01)

(52) U.S. Cl.
CPC ....... *H04N 1/00411* (2013.01); *G06F 3/1278* (2013.01); *H04N 1/0044* (2013.01); *H04N 1/00392* (2013.01); *H04N 1/00477* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 4,682,158 A | * | 7/1987 | Ito | ........................ G03G 15/55 340/679 |
| 6,222,539 B1 | * | 4/2001 | Watts | ................. H04N 1/00352 715/708 |
| 8,934,801 B2 | * | 1/2015 | Saito | ................... H04N 1/00482 399/70 |
| 9,794,438 B2 | | 10/2017 | Sawada | |
| 10,033,889 B2 | | 7/2018 | Sawada | |
| 10,291,803 B2 | | 5/2019 | Sawada | |
| 2012/0043715 A1 | | 2/2012 | Kawano et al. | |
| 2017/0177094 A1 | * | 6/2017 | Takatsuki | ............... H03M 11/14 |

FOREIGN PATENT DOCUMENTS

JP  2012-042888 A  3/2012

OTHER PUBLICATIONS

Co-pending U.S. Appl. No. 16/781,018, filed Feb. 4, 2020.

* cited by examiner

*Primary Examiner* — Dov Popovici
(74) *Attorney, Agent, or Firm* — Venable LLP

(57) ABSTRACT

An image forming apparatus includes an image forming portion configured to form an image on a sheet; and an operating portion including a display screen which includes at least numeric keys, a start key configured to cause the image forming portion to start image formation, and a stop key configured to stop the image formation by the image forming portion, and including a hardware key provided on a back side of the display screen and configured to start a maintenance mode of the image forming apparatus.

9 Claims, 8 Drawing Sheets

(a)

(b)

IMAGE FORMING APPARATUS

FIELD OF THE INVENTION AND RELATED ART

The present invention relates to an image forming apparatus for forming an image in an electrophotographic type.

In recent years, with multi-functionalization of the image forming apparatus, a display portion, provided with a touch panels of an operating portion for carrying out display and input is upsized. Further, user authentication and management are performed with an IC card, and therefore, an image forming apparatus with which an IC card reader BOX portion is juxtaposed becomes mainstream. FIG. 7 is an enlarged perspective view of an operating portion 201 of a conventional printer 100 possessing such a feature and a periphery thereof. The printer 100 is actuated by turning on a main switch (electric power switch) 220, a sheet on which an image is formed by execution of a print job is discharged onto a discharge portion 17. Further, an operating portion 201 is fastened and fixed to a reader 301 for reading an image, with screws. The operating portion 201 is provided with a touch panel 204 incorporating a display portion and a hardware key portion 230 including hardware keys such as a numeric keypad and a start key. On a left(-hand) side of the operating portion 201, an IC card reader BOX portion 202 having an IC card authentication function is provided. A user of the printer 100 brings an IC card near to an upper surface 202a portion of the IC and reader BOX portion 202, whereby an IC card reader reads user information from the IC card and authenticates the user information, so that the user can use the printer 100. However, the operating portion 201 including the hardware key portion 230 and the touch panel 204 and the IC card reader BOX portion 202 are juxtaposed on a front side of the apparatus (printer), so that the discharge portion 17 is not readily in sight. For that reason, viewability of a small-size sheet discharged on the discharge portion 17 lowers, and when the sheet is taken out of the discharge portion 17, the sheet and/or user's hand(s) touches the operating portion or the like and thus causes a lowering in operativity.

In order to solve these problems, for example, in Japanese Laid-Open Patent Application (JP-A) 2012-42888, an image forming apparatus in which a key-less panel is provided so that an operation performed using a hardware key portion is performed with a touch panel has been proposed. FIG. 8 is a perspective view showing a structure of the image forming apparatus proposed in JP-A 2012-42888. As shown in FIG. 8, an operating panel portion 21 has a constitution in which the operation performed using the hardware key portion is performed with the touch panel, and is the key-less panel from which the hardware key portion 230 such as the numeric keypad juxtaposed with the touch panel 204 incorporating the display portion shown in FIG. 7 is removed. By removing the hardware key portion, the operating panel portion 21 can be downsized (particularly decreased in lateral width (dimension)), so that it becomes possible to ensure an open space having a sufficient width between the operating panel portion and the image forming apparatus. As a result, when the user looks in a discharge portion 22, provided between an image reading portion 23 and an image forming portion 24 from an upper surface, a range in which the discharge portion 22 is blocked from view by the operating panel portion 21 is decreased, and therefore, viewability of the sheet discharged on the discharge portion 22 is remarkably improved.

By introducing the key-less panel, a button operation by the hardware key portion provided on a conventional operating portion is changed to an operation on the touch panel. However, by removing the hardware key portion from the operating portion, when a service maintenance operation is performed, the following problem arises. For example, in the case where the touch panel itself is broken, when a component part of the touch panel is exchanged, there is a need to set coordinates of the touch panel again. For that purpose, on a display screen of the operating portion, there is a need to display a service maintenance screen. Conventionally, in order to display the service maintenance screen, the service maintenance service has been actuated by pressing a hardware key provided to the operating portion 201 shown in FIG. 7. The service maintenance screen is a screen provided exclusively for a service person, and is actuated through a complicated operation so that the perspective view maintenance screen is not easily actuated by the user of the image forming apparatus. For example, there was an instance said that after a main switch is turned on, a plurality of hardware keys provided at a position other than a touch panel are pressed by the service person at operation timing when a normal user does not use the hardware keys and thus the service person accesses the service maintenance screen, but when the hardware keys are removed, there arose a problem that these operations cannot be performed.

As described above, the operating portion 201 is downsized by removing the hardware key portion 230 from the operating portion 201, so that viewability of the sheet discharged on the discharge portion is remarkably improved. On the other hand, the hardware keys of the operating portion also have the function as a functional switch used in a maintenance operation or the like by the service person. For that reason, for operations during the above-described service maintenance operation, there was a need to separately provide a switch function which is an alternative to the conventional hardware keys.

The present invention has been accomplished in view of the above-described circumstances, and a principal object to the present invention is to provide an image forming apparatus capable of smoothly performing a service maintenance operation to an operating portion provided with no hardware key such as a numeric keypad.

SUMMARY OF THE INVENTION

According to an aspect of the present invention, there is provided an image forming apparatus comprising: an image forming portion configured to form an image on a sheet; and an operating portion including a display screen which includes at least numeric keys, a start key configured to cause the image forming portion to start image formation, and a stop key configured to stop the image formation by the image forming portion, and including a hardware key provided on a back side of the display screen and configured to start a maintenance mode of the image forming apparatus.

Further features of the present invention will become apparent from the following description of exemplary embodiments with reference to the attached drawings.

Figure 6:
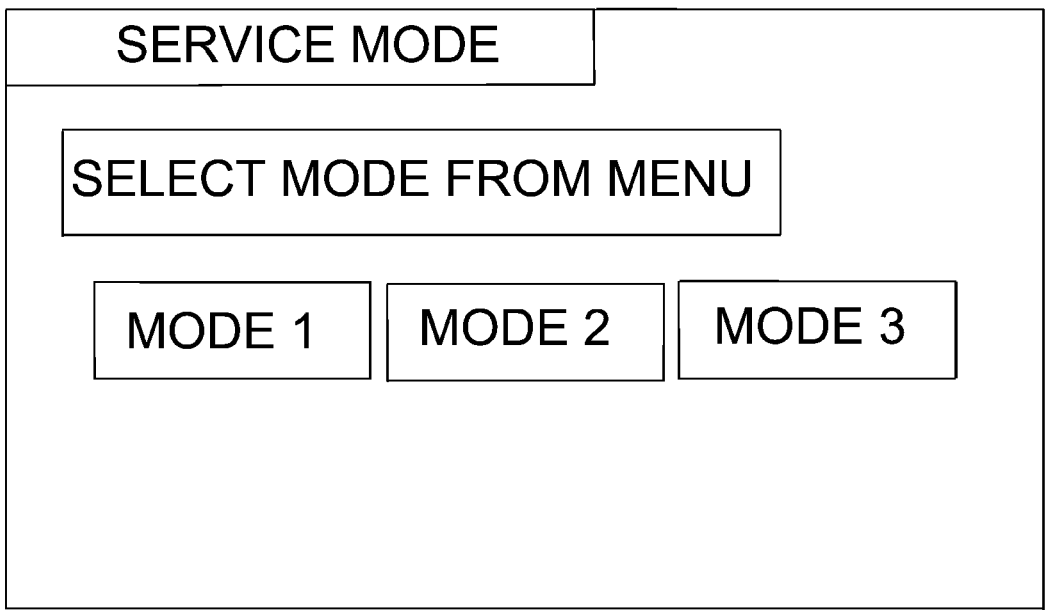
Figure 6:
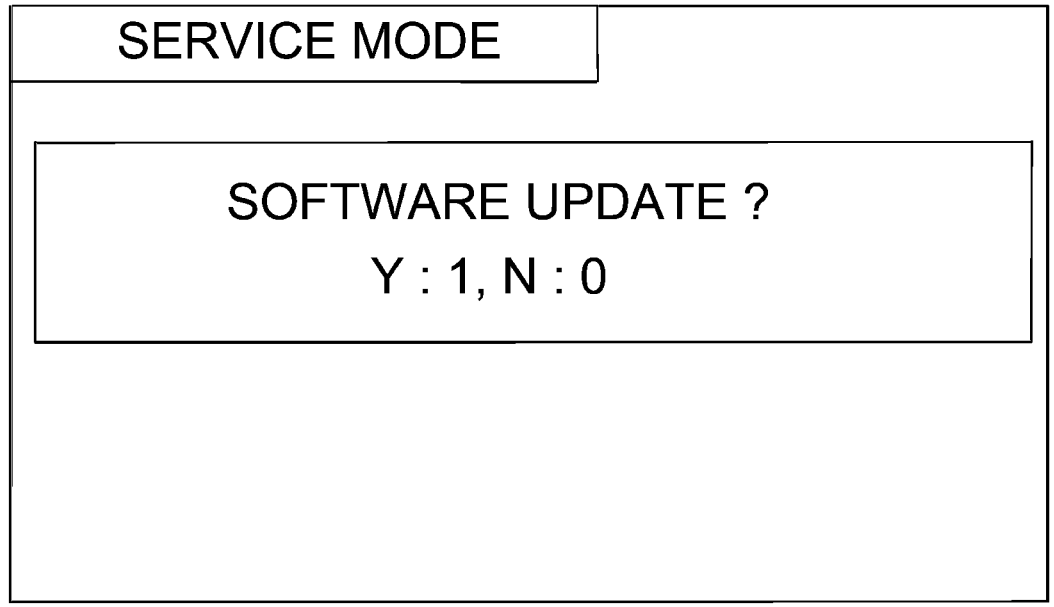

Parts (a) and (b) of FIG. 6 are schematic views each showing an example of display of a screen of a service mode in the embodiment.

Figure 7:
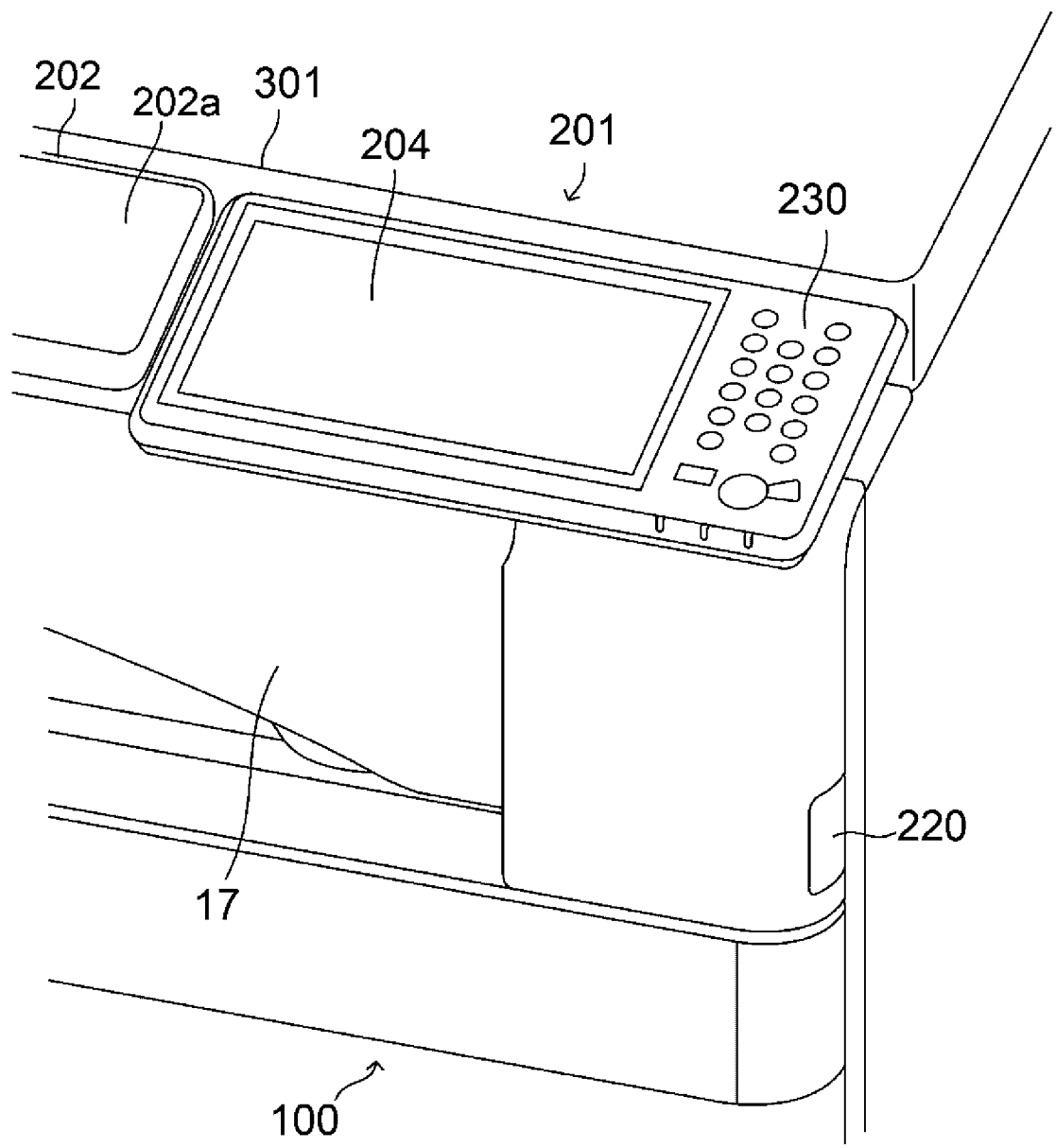

FIG. 7 is a service of an operating portion including a hardware key portion in a conventional example.

Figure 8:
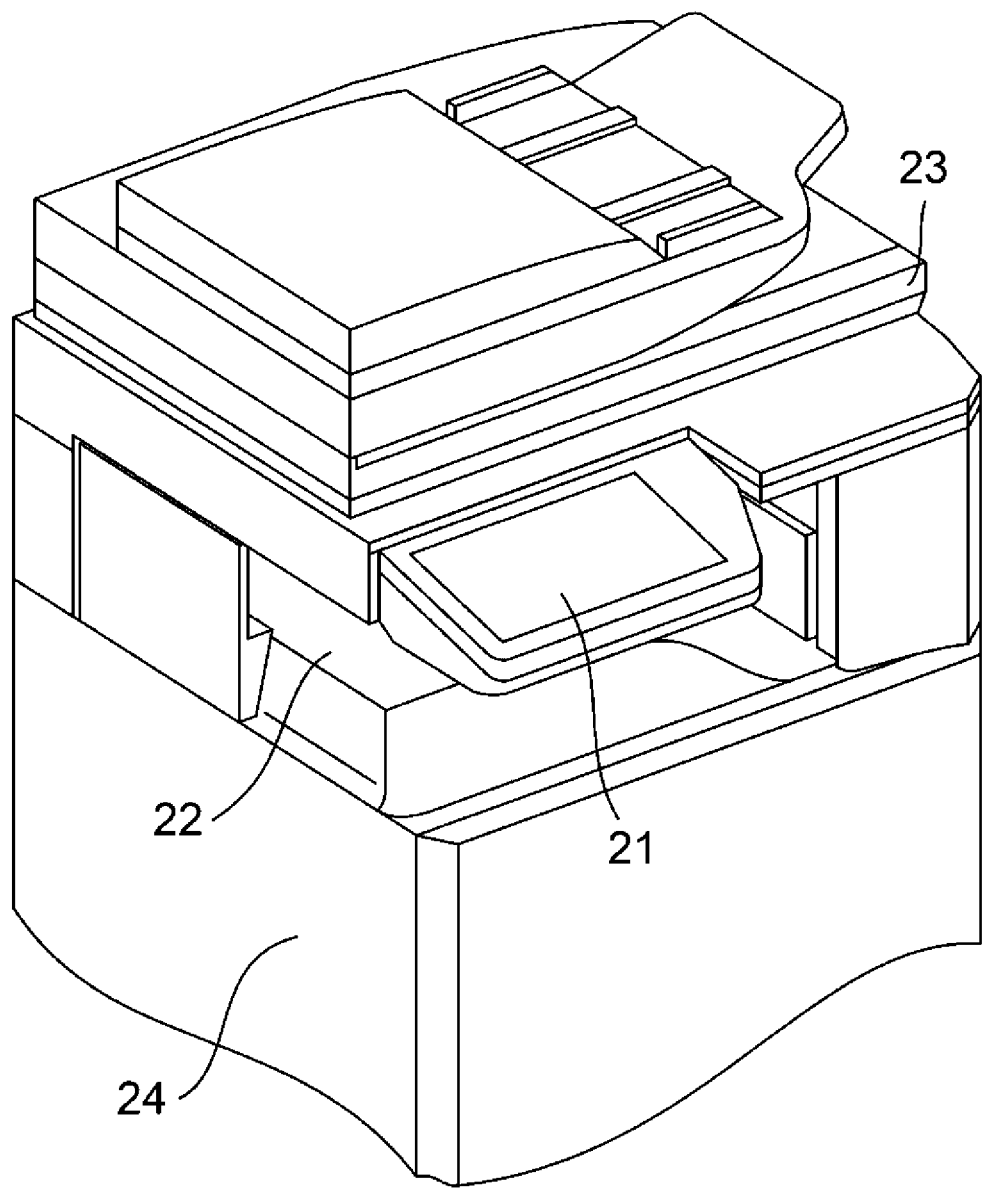

FIG. 8 is a perspective view of an image forming apparatus including a key-less operating portion in a conventional example.

DESCRIPTION OF EMBODIMENTS

In the following, embodiments of the present invention will be specifically described with reference to the drawings.

Embodiment

Image Forming Apparatus

Figure 1:
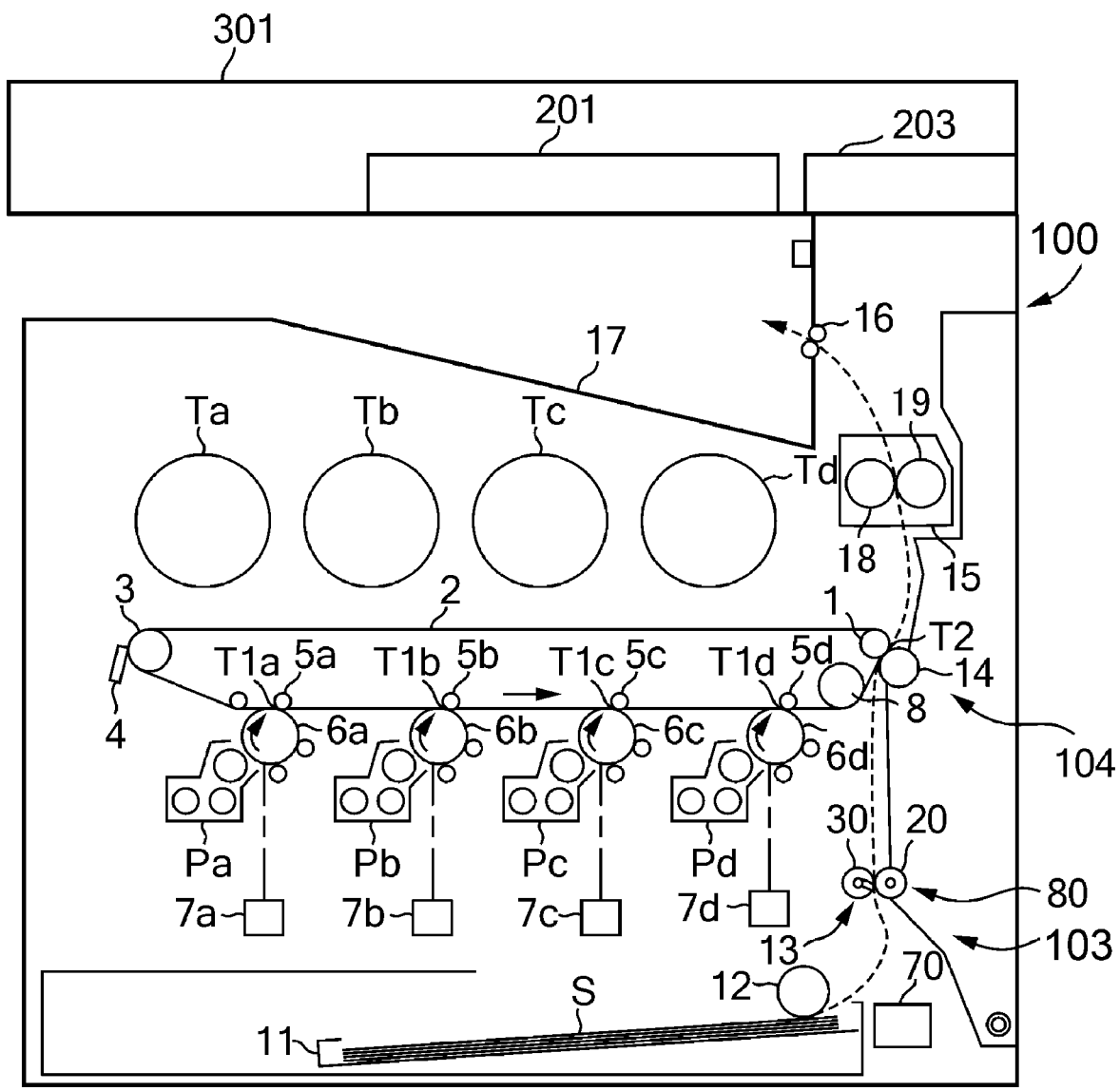
FIG. 1 is a schematic sectional view of an image forming apparatus according to an embodiment.

A structure of a printer 100 which is an image forming apparatus according to an embodiment will be described with reference to FIG. 1. FIG. 1 is a schematic sectional view showing the structure of the printer 100. As shown in FIG. 1, the printer 100 includes a sheet (paper) feeding cassette 11 accommodating therein a plurality of sheets S and a sheet feeding portion 103 for feeding and conveying the sheet S from the sheet feeding cassette 11. Further, the printer 100 includes an image forming portion 104 for forming an image on the sheet S fed by the sheet feeding portion 103, a discharging roller pair 16 for discharging the sheet S on which the image is formed, and a discharge portion 17 on which the discharged sheet S is stacked. The sheet feeding portion 103 includes a sheet feeding roller 12 for feeding the sheets S, accommodated in the sheet feeding cassette 11, one by one through a frictional separation scheme, and a feeding roller pair 13, including a first roller 30 and a second roller 20, for further feeding the fed sheet S. The sheet feeding portion 103 further includes an oblique movement correcting mechanism 80 for correcting oblique movement of the sheet S fed by the feeding roller pair 13. The printer 100 includes a controller 70 for controlling an entirety of the sheet feeding portion 103 including drive of the sheet feeding roller 12 and the feeding roller pair 13. Incidentally, the controller 70 carries out control of an entirety of the printer 100 including not only the sheet feeding portion 103 but also the image forming portion 104.

The image forming portion 104 includes four process cartridges Pa, Pb, Pc and Pd for forming images of colors of yellow (Y), magenta (M), cyan (C) and black (K), respectively. Further, the image forming portion 104 includes exposure devices 7a, 7b, 7c and 7d. Suffixes a, b, c and d of the reference numerals or symbols represent devices or maintenances corresponding to toner colors of yellow (Y), magenta (M), cyan (C) and black (K), respectively. Incidentally, in the following, addition of the suffixes a to d of the reference numerals or symbols will be omitted except for the case where the colors are restricted to a specific toner color.

Each process cartridge P includes a photosensitive drum 6 on which an electrostatic latent image is formed. The respective process cartridges have the same constitution except that the toner colors of the images to be formed. The image forming portion 104 includes an endless intermediary transfer belt 2 onto which the toner images formed on the photosensitive drums 6 are to be transferred, and primary transfer rollers 5 for transferring the toner images from the photosensitive drums 6 onto the intermediary transfer belt 2. Each primary transfer roller 5 forms a primary transfer portion T1 by sandwiching the intermediary transfer belt 2 between itself and the associated photosensitive drum 6. At the primary transfer portions T1, the color toner images formed on the photosensitive drums 6 are transferred onto the intermediary transfer belt 2.

The image forming portion 104 includes an inner secondary transfer roller 1, a tension roller 3 and an upstream secondary transfer roller 8 which stretch the intermediary transfer belt 2, and a cleaning portion 4 for cleaning the intermediary transfer belt 2. The image forming portion 104 further includes toner cartridges T for supplying toners to the process cartridges P. Further, the image forming portion 104 includes a secondary transfer roller 14 for transferring the toner images from the intermediary transfer belt 2 onto the sheet S, and a fixing portion 15 for fixing unfixed toner images transferred on the sheet S by heating and pressing the unfixed toner images.

Next, an image forming operation of the printer 100 will be described. When a print job is started in accordance with setting of the operating portion 201, the photosensitive drum 6 is irradiated with laser light by the exposure device 7 on the basis of first information of thee print job inputted from an external PC or the like. The photosensitive drum 6 is electrically charged to a predetermined potential in advance, and is irradiated with the laser light from the exposure device 7, so that the electrostatic latent image is formed on the photosensitive drum 6. Thereafter, the toner is deposited on the electrostatic latent image formed on the photosensitive drum 6, so that the respective toner images of yellow (Y), magenta (M), cyan (C) and black (K) are formed on the photosensitive drums 6.

At each of the primary transfer portions T1, a primary transfer bias is applied to the primary transfer roller, and at the same time, the intermediary transfer belt 2 is pressed in a direction of the photosensitive drum 6. As a result, the respective color toner images formed on the photosensitive drums 6 are successively transferred superposedly from the photosensitive drums 6 onto the intermediary transfer belt 2 at the primary transfer portions T1. The four color toner images superposedly transferred on the intermediary transfer belt 2 are fed to the secondary transfer roller 14 by rotational drive of the intermediary transfer belt 2.

On the other hand, in parallel to the toner image forming operation of the image forming portion, the sheets S accommodated in the sheet feeding cassette 11 are fed one by one by the sheet feeding roller 12 and then the sheet S is fed to the feeding roller pair 13 at predetermined timing. The feeding roller pair 13 feeds the sheet S to the secondary transfer portion T2, where the secondary transfer roller 14 and the intermediary transfer belt 2 contact each other, while correcting oblique movement of the sheet S by an oblique movement correcting mechanism 80. At the secondary transfer portion T2, a secondary transfer bias is applied to the secondary transfer roller 14, and at the same time, the sheet S is nipped and fed by the secondary transfer roller 14 and the intermediary transfer belt 2, so that the four color toner images are transferred onto the sheet S. The sheet S on which the toner images are transferred is fed to the fixing portion 15 including a heating roller 18 and a feeding roller 19, and is heated and pressed by the fixing portion 15, so that unfixed toner images are fixed on the sheet S. Thereafter, the sheet S on which the toner images are discharged onto the discharge portion 17 by the discharging roller pair 16, so that a senses of image forming operations is ended.

Further, at an upper portion of the printer 100, a reader 301 for reading the image, the operating portion 201 for permitting information display and data input, and an IC card reader portion 203 are provided. In this embodiment, a side where the operating portion 201 is disposed is defined as a front side (surface) of the image forming apparatus.

Operating Portion of Image Forming Apparatus

Figure 2:
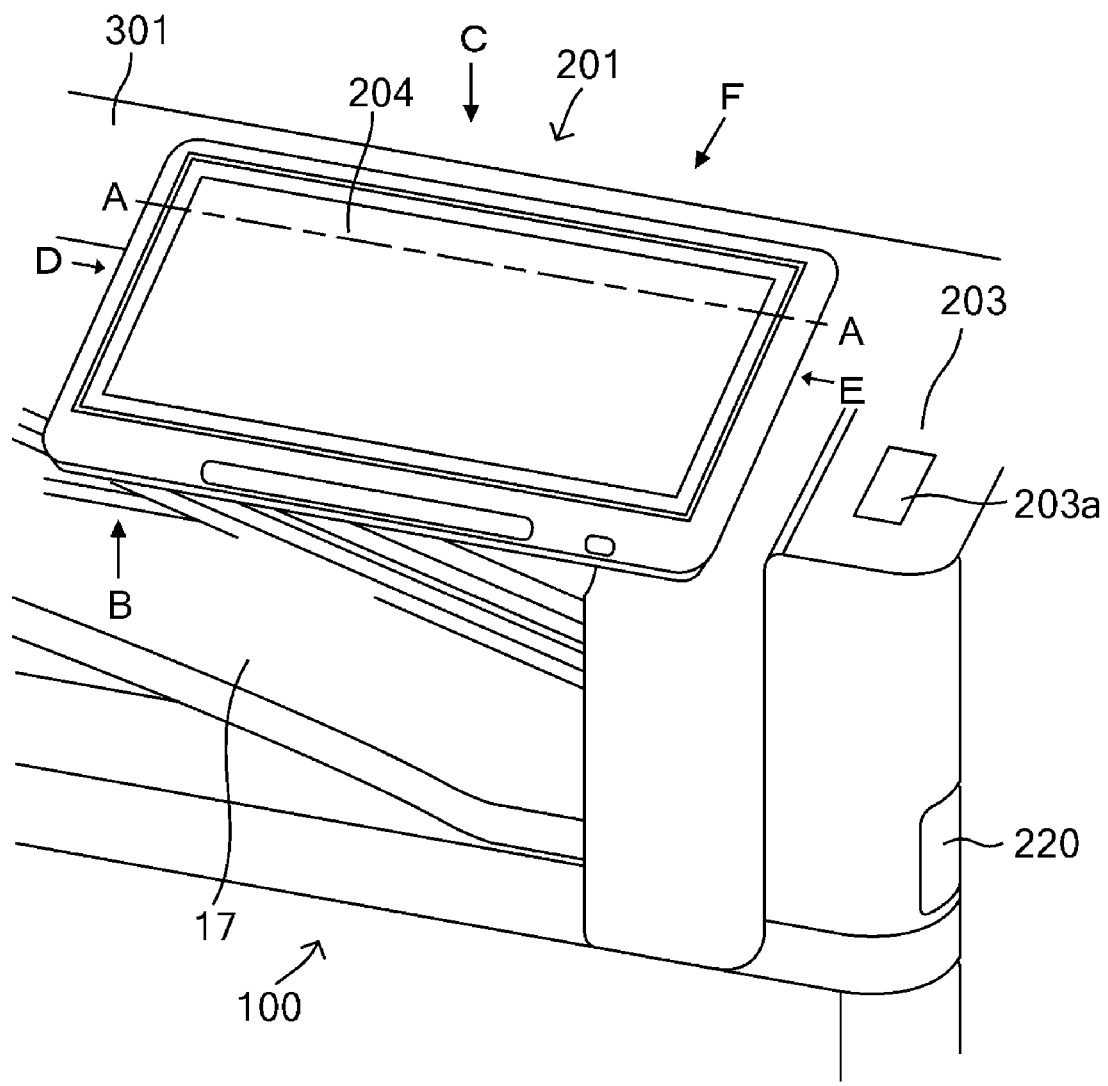
FIG. 2 is a perspective view of an operating portion of the image forming apparatus in the embodiment and a periphery of the operating portion.
Figure 3:
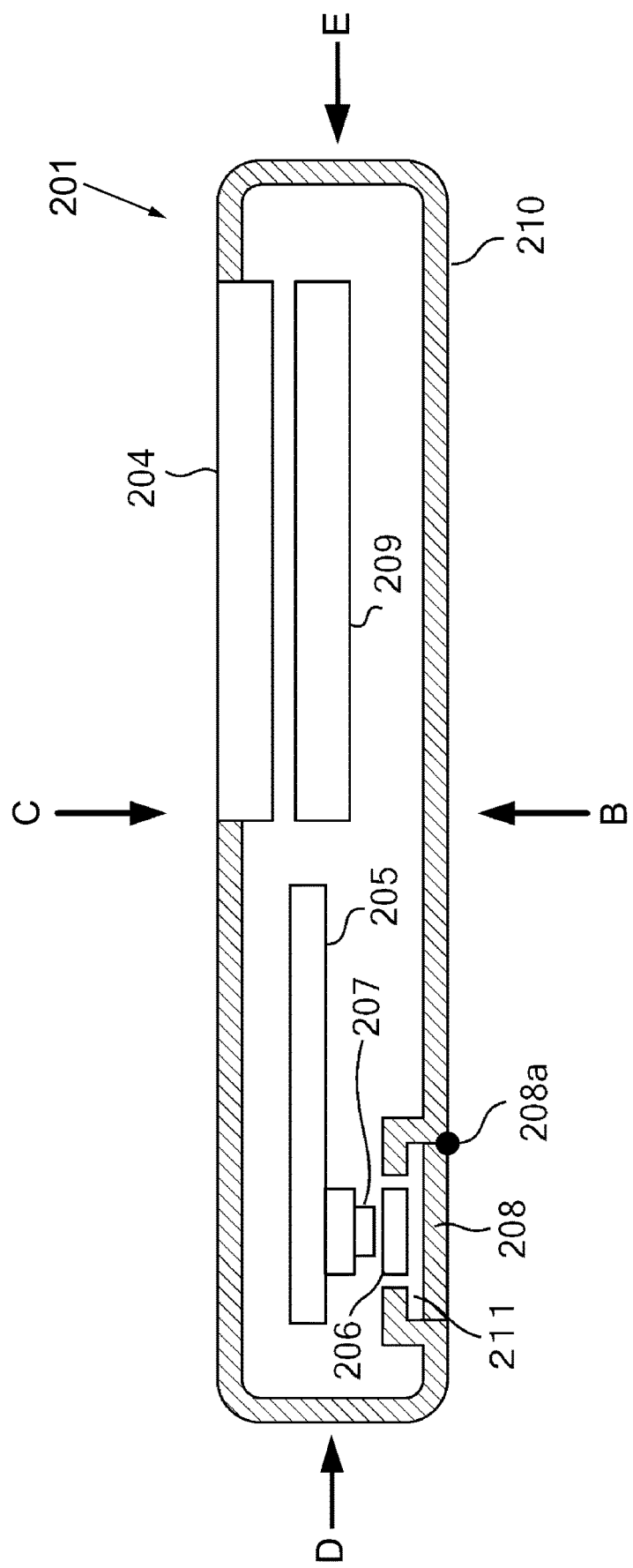
FIG. 3 is a sectional view of the operating portion in the embodiment taken along A-A line of FIG. 2.

FIG. 2 is an enlarged perspective view of the operating portion 201 and its periphery of the printer 100 described with reference to FIG. 1. With reference to FIG. 2, a device structure of the operating portion 201 and a periphery of the operating portion 201 will be described. In FIG. 2, the operating portion 201 includes a touch panel 204 (display screen) incorporating a display portion 209 (FIG. 3). As regards the operating portion 201, compared with the operating portion 201 of FIG. 7 in the above-described conventional example, the hardware key portion 230 including at least the numeric keypad, the start key for starting the image forming operation, and the stop key for stopping the image forming operation is removed, and therefore the operating portion 201 in this embodiment is downsized. In the operating portion 201 in this embodiment, at least numeric keys, a start key and a stop key are displayed as software keys on the display screen. In addition, a status key indicating a process status of the image forming job and a clear key for clearing information inputted by the numeric keys, and the like key may also be displayed. Further, in FIG. 7, the IC and reader BOX portion 202 was juxtaposed with the operating portion 201 on the left(-hand) side, but in FIG. 2, the IC and reader portion 203 in this embodiment is disposed on a right(-hand) side of the operating portion 201. The IC card reader portion 203 incorporates an IC card reader having an IC card authentication function. A user of the printer 100 brings an IC card near to an upper surface 203a of the IC card reader portion 203, so that the IC card reader reads user information from the IC card and authenticates the user information whereby the user can use of the printer 100. Further, a main switch (electric power switch) 220 is a seesaw switch for turning on and off the main switch of the printer 100, and a state of the printer 100 is maintained at a turning-on position or a turning-off position of the main switch 220 by an operation of the main switch 220.

In FIG. 7 in the conventional example, the IC card reader BOX portion 202 was provided on the left side of the operating portion 201 and the discharge portion 17 was blocked from view by the IC card reader BOX portion 202, so that the viewability of the sheet discharged on the discharge portion 17 was lowered. On the other hand, in the printer 100 of this embodiment, the IC card reader portion 203 is provided on the right side of the operating portion 201 as shown in FIG. 2 in this embodiment, whereby the viewability of the sheet discharged on the discharge portion 17 is improved.

Figure 4:
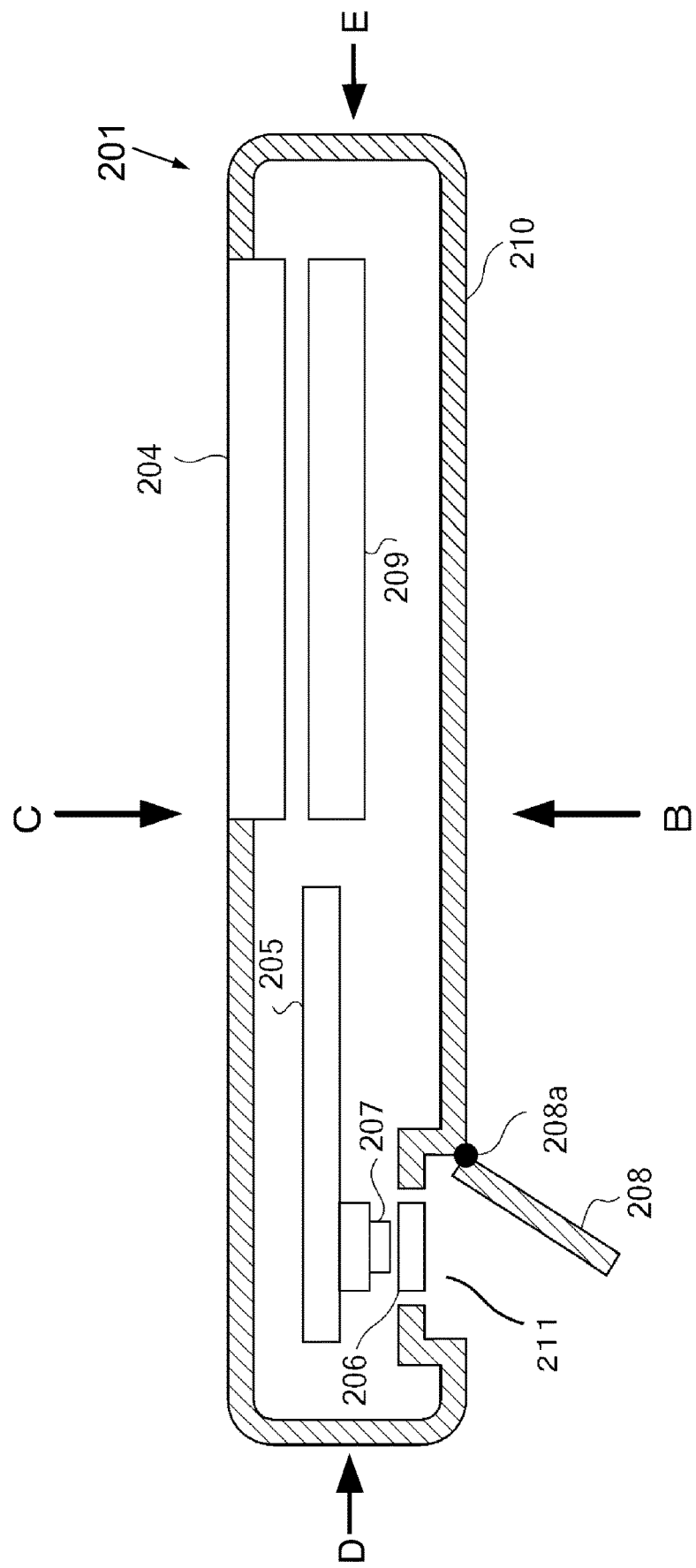
FIG. 4 is a sectional view of the operating portion in the embodiment taken along the A-A line of FIG. 2.

Incidentally, in FIG. 2, a line A-A represents a cut line of the operating portion 201 shown in FIGS. 3 and 4 described later. Further, arrows (arrow lines) B to F represent viewing directions of the operating portion 201. That is, the arrow B represents a direction in which the operating portion 201 is seen from a back (bottom) (surface) side, the arrow C represents a direction in which the touch panel 204 is seen from above, the arrow D represents a direction in which the operating portion 201 is seen from the left side in the figure, the arrow E represents a direction in which the operating portion 201 is seen from the right side in the figure, and the arrow F represents a direction in which the touch panel 204 is seen from the reader 301 side.

Internal Structure of Operating Portion

FIG. 3 is a schematic view showing an internal structure of the operating portion 201 cut along a cut line A-A shown in FIG. 2. In FIG. 3, the arrows B, C, D and E represent the viewing directions of the operating portion 201 described with reference to FIG. 2. The operating portion 201 includes a display portion 209 of an LCD type inside an operating portion case 210. The user of the printer 100 is capable of visually recognizing the display portion 209 via (through) the touch panel 204. Further, the touch panel 204 can detect whether or not the user touches (presses) any position (any portion) of the touch panel 204. A control substrate 205 detects pressing of the touch panel 204 and controls display of the display 209. The control substrate 205 is connected to a control substrate (not shown) of the printer 100 via a control cable (not shown). Further, when the main switch 220 is turned on, electric power is supplied to the control substrate 205 via the control substrate and the control cable of the printer 100.

The operating portion case 210 includes a cap (cover) 208 openable about a rotation shaft 208a on a back side thereof, and FIG. 3 shows a closed state of the cap 208. Inside the cap 208, a recessed portion 211 including a key top (button) 206 which is a switch portion is provided. At a position of the control substrate 205 opposing the key top 206, a tactile switch 207 is provided, and when the key top 206 is pressed, the tactile switch 207 is pressed, so that pressing of the key top 206 can be detected.

FIG. 3 is the sectional view showing the operating portion 201 in the closed state of the cap 208, and in the closed state of the cap 208, a service person (or the user) cannot externally have access to the key top 206. On the other hand, FIG. 4 is a schematic view showing a state in which the cap 208 is opened by rotation of thereof about the rotation shaft 208a from the closed state of FIG. 3. In FIG. 4, the key top 206 provided in the recessed portion 211 is in a state in which the cap 208 is open, so that the service person externally has access to the key top 206.

Key Top of Operating Portion

Figure 5:
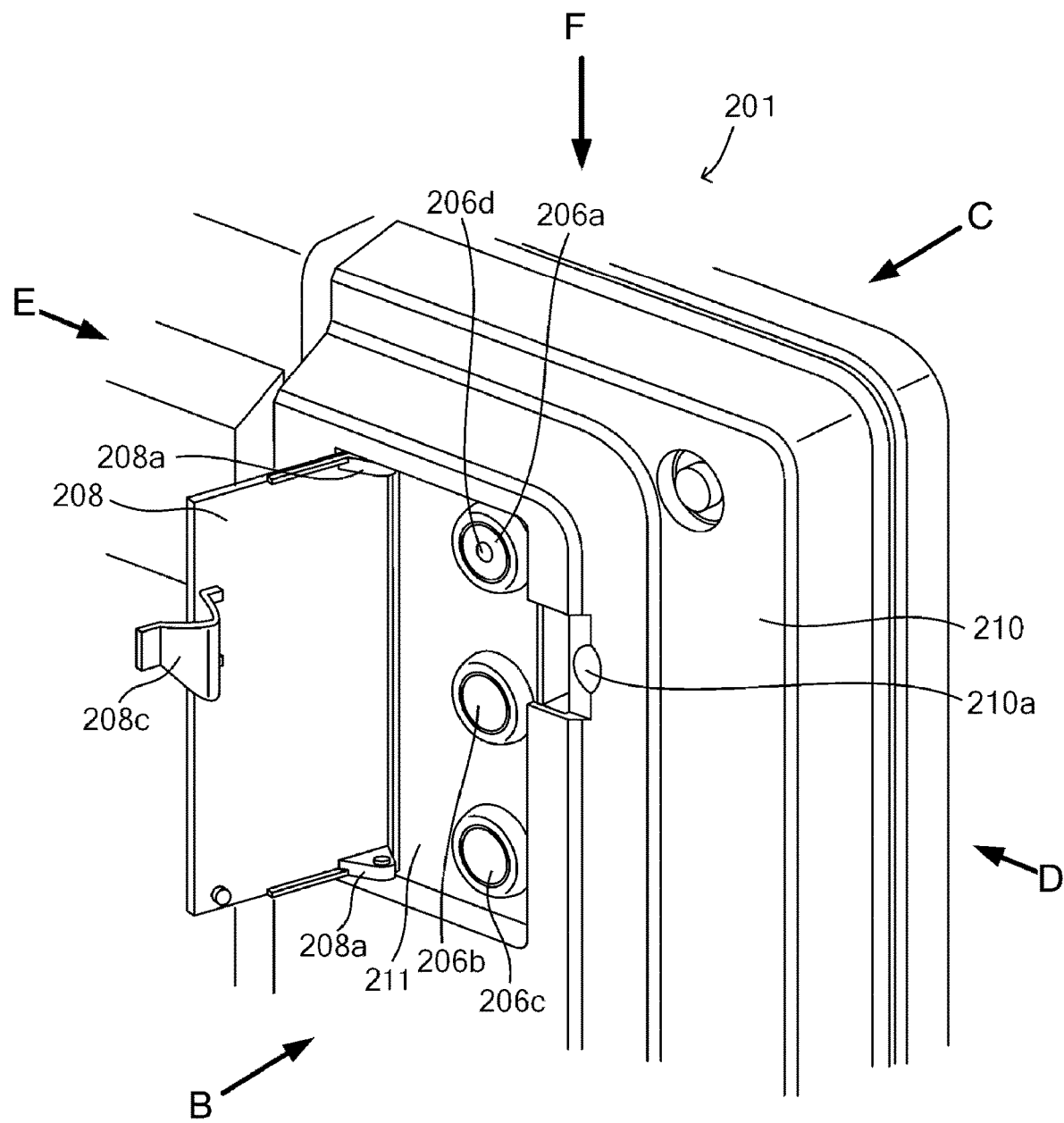
FIG. 5 is a perspective view showing a back side of the operating portion in the embodiment.

FIG. 5 is an enlarged perspective view showing a periphery of the recessed portion 211 in a state in which the cap 208 provided on the back side of the operating portion 201 in the neighborhood of a left-side end portion of the operating portion 201 shown in FIG. 2. In FIG. 5, the arrows B, C, D, E and F represent the viewing directions of the operating portion 201 when the operating portion 201 shown in FIG. 2 is viewed from the back side, the upper surface side, the left side, the right side, and the reader 301 side, respectively. Thus, the recessed portion 211 in which the key top 206 is provided on the back side of a left-side surface in FIG. 2 when the service person stands in front of the operating portion 201 shown in FIG. 2.

FIG. 5 shows an open state of the cap 208 in which the cap 208 of the recessed portion 211 provided in the neighborhood of the side surface of the operating portion 201 is rotated about two rotation shafts 208a. When the cap 208 is closed, a hole 210a is provided at a position where a lock mechanism 208c provided on the cap 208 contacts the operating portion case 210. The lock mechanism 208c is locked in the hole 210a whereby the cap 208 is fixed to the operating portion case 210, so that a lockable constitution (a state shown in FIG. 3) is established. Further, when the cap 208 is opened as shown in FIG. 4 from the closed state thereof as shown in FIG. 3, the cap 208 is released, by being pressed with a minus type screwdriver or the like, from a state in which the cap 208 is fixed by the lock mechanism 208c. Then, a constitution in which by rotating the cap 208 about the rotation shafts 208a, the cap 208 is opened is employed. The lock mechanism 208c is not released unless a tool such as the screwdriver or the like is used, and therefore, a constitution in which the cap 208 is not opened even when a hand or finger(s) of the user of the printer 100 touches the lock mechanism 208c is employed.

As shown in FIG. 5, in the recessed portion 211, three key tops (buttons) 206a, 206b and 206c are provided. Incidentally, as described above, at positions of the control substrate 205 opposing the respective key tops 206a, 206b and 206c, tactile switches 207 are provided. In this embodiment, each of the key tops 206a, 206b and 206c is about 20 mm in key pitch (center distance of keys) and 10 mm in key size (key diameter). Further, in FIG. 5, the upper key top 206a is provided with a projection 206a at a central portion thereof. When a maintenance operation is performed, by touch of the projection 206d with a fingertip of the service person, it is possible to discriminate that the touched portion is the key top 206a. Further, in this embodiment, centers of the three key tops 206a, 206b and 206c are positioned along and in parallel to the left-side surface of the operating portion case 210 shown in FIG. 2 at arbitrary positions (of about 20 mm to 70 mm from an end of the left side surface) within a distance of a range such that finger(s) of the service person reaches the key tops from the left-side surface of the operating portion case 210. Incidentally, as regards an arrangement of the key tops 206a, 206b and 206c within the range of about 20 mm to 70 mm from the end of the left-side surface, when a size of 95% of American men large in body dimension is taken as a basis, it is assumed that a length of a hand when the panel or the like is gripped is about 85 mm. For that reason, when the positions of the key tops are 85 mm or less from the end of the left-side surface, a forefinger, the distance is within a range such that a middle finger and a ring finger of the service person reach the key tops and can press the keys, and in this embodiment, the positions of the key tops are about 50 mm falling within the range of about 20 mm to 70 mm from the end of the left-side surface of the operating portion case 210.

Further, the reason why the recessed portion 211 in which the three key tops 206 are provided is disposed on the left side of the operating portion case 210 is as follows. That is, in general, right-handed persons are larger in number than left-handed persons and thus it would be considered that when an operation in a maintenance mode is performed, the service person easily performs the operation in the maintenance mode by operating the key tops with the left hand and by operating the display portion with the right hand. As described above, when the service person presses the key tops 206 of the recessed portion 211 in a state in which the service person opens the cap 208, the service person is capable of pressing one or a plurality of the key tops 206 by holding the respective key tops 206a, 206b and 206c.

Use Example of Key Top as Service Switch

A use example of the key tops 206 in the case where a screen for various printings and a screen, for maintenance service, such as a failure diagnosis screen are actuated will be described. In a state in which the main switch 220 is turned off, the cap 208 of the operating portion case 210 is opened, and then main switch 220 is turned on. Thereafter by pressing down the key top 206a at predetermined timing the control substrate (not shown) of the printer 100 actuates a process of an operation in a maintenance service mode in which maintenance and checkups and the like of the printer 100. Then, the control substrate of the printer 100 provides an instruction to the control substrate 205 of the operating portion 201 so that the screen for maintenance service is displayed at the display portion 209 as shown in part (a) of FIG. 6. Part (a) of FIG. 6 is a schematic view showing an example of a screen which is displayed at the display portion 209 of the operating portion 201 and which indicates a menu of the maintenance mode in the case where the maintenance mode is designated. The service person may only be required to select an associated service from mode 1, mode 2 and mode 3 and the press down an associated display portion. Thus, the service person is capable of carrying out the various test printings and the failure diagnosis through the screen for the maintenance service displayed at the display portion 209 of the operating portion 201.

Next, a use example of the key tops in the case where a software update of the printer 100 is carried out will be described. In the state in which the main switch 220 is turned off, the cap 208 of the operating portion case 210 is opened and then the main switch 220 is turned on. Thereafter, a USB memory in which a software for update is inserted into a USB terminal connected to a controller (not shown) of the printer 100. Then, at predetermined timing, the key top 206b is pressed down, whereby the control substrate of the printer 100 recognizes that the software update (mode) of the maintenance service mode is actuated, and provides an instruction to display the screen for the maintenance service shown in part (b) of FIG. 6. Part (b) of FIG. 6 is a schematic view showing an example of a display screen displayed at the display portion 209 in the case where the software update is designated. The service person inputs "1" in accordance with a message displayed on the screen of the display portion 209, whereby the software to be updated is read from the USB memory and thus the software update is carried out.

As described above, on a back side portion of the operating portion 201 provided with no hardware key on an upper surface of the operating portion 201 due to downsizing, the key tops 206 for the maintenance operation are provided, whereby the maintenance operation which is not different from a conventional maintenance operation can be smoothly performed. Particularly, the key tops 206 are provided on the back side of the operating portion 201, and therefore, the key tops 206 are not readily recognized visually from the front side of the operating portion 201. Further, the recessed portion 211 in which the key tops 206 are provided is covered with the cap 208 locked in the closing direction by the lock mechanism 208c, and in order to release the lock mechanism 208c, the screwdriver or the like is needed, and therefore, the user is prevented from erroneously touching the lock mechanism 208c and opening the cap 208.

Further, the key tops 206 are provided on the back side of the operating portion 201, and therefore, when the service person uses the key tops 206, the service person cannot directly visually recognize the key tops 206. For that reason, in this embodiment, the specific key top 206a is provided with the projection on the surface thereof, so that even when the key tops 206 cannot be visually recognized, the service person is capable of grasping that by touching the projection 206d with the fingertip of the service person, the touched portion is the specific key top 206a. For that reason, the order of arrangement of the key tops 206 can be recognized, so that good operativity can be realized.

Further, the key tops 206 are disposed within the range in which the fingers of the service person reach the key tops 206 from the left-side surface of the operating portion 201 shown in FIG. 2 and are disposed substantially in parallel to and along the side surface of the operating portion 201. As a result, even when the plurality of key tops 206 are provided for enabling setting of some service modes, good operativity can be realized. Further, in order to permit an on-operation while operating the key top 206, the main switch 220 is disposed at a position where the hand of the service person reaches the main switch 220, and therefore, the key top 206 and the main switch 220 can be operated with both hands of the service person.

Incidentally, the control substrate 205 for controlling the operating portion 201 in this embodiment has a constitution in which the tactile switches are mountable, and there is no need to provide a substrate exclusively for the tactile switches, and therefore downsizing and cost reduction of the operating portion 201 can be realized.

Further, in this embodiment, as shown in FIG. 2, the main switch 220 was provided on the right side of the operating portion 201, and the key tops 206 are provided on the back side close to the left-side surface of the operating portion 201, by the present invention is not limited to this arrangement. For example, a similar effect can be achieved even when the main switch 220 is provided on the left side of the operating portion 201 and the key tops 206 are provided on the back side close to a right-side surface of the operating portion 201.

As described above, according to this embodiment, the service maintenance operation can be smoothly carried out using the operating portion provided with no hardware key.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-210697 filed on Nov. 8, 2018, which is hereby incorporated by reference herein in its entirety.

What is claimed is:

1. An image forming apparatus comprising:
   an image forming portion configured to form an image on a sheet; and
   an operating portion including a display screen which includes at least numeric keys, a start key configured to cause said image forming portion to start image formation, and a stop key configured to stop the image formation by said image forming portion, and including a hardware key provided on a back side of said display screen and configured to start a maintenance mode of said image forming apparatus.

2. An image forming apparatus according to claim 1, further comprising,
   a main switch,
   wherein the maintenance mode is started by pressing down said main switch in a state in which said hardware key is pressed down.

3. An image forming apparatus according to claim 2, wherein said main switch is provided on a right side of said hardware key with respect to a widthwise direction of said image forming apparatus as seen from a front side of said image forming apparatus.

4. An image forming apparatus according to claim 1, wherein said hardware key includes a plurality of keys, and
   wherein the maintenance mode to be started is different depending on a combination of said plurality of keys.

5. An image forming apparatus according to claim 1, further comprising,
   an openable cover provided on a back side of said display screen and configured to cover said hardware key.

6. An image forming apparatus according to claim 5, further comprising,
   a locking mechanism provided on an outer casing cover of said operating portion so as to maintain a state in which said cover is closed, and configured to engage with said cover.

7. An image forming apparatus according to claim 1, wherein said hardware key is provided to said operating portion so that a center of said hardware key is positioned in a range of 20 mm or more and 70 mm or less from a left-side surface of an outer casing cover of said operating portion.

8. An image forming apparatus according to claim 4, wherein said plurality of keys are provided to said operating portion so that a center of each of said plurality of keys is positioned in a range of 20 mm or more and 70 mm or less from a left-side surface of an outer casing cover of said operating portion as seen from a front side of said image forming apparatus.

9. An image forming apparatus according to claim 8, wherein said plurality of keys are disposed substantially in parallel to the left-side surface as seen from the front side of said image forming apparatus.

* * * * *